US006176956B1

United States Patent
Hansen

(10) Patent No.: US 6,176,956 B1
(45) Date of Patent: Jan. 23, 2001

(54) METHOD AND APPARATUS FOR THE MANUFACTURING OF PAINT ROLLERS

(75) Inventor: Göran Hansen, Lundgatan (SE)

(73) Assignee: Anza AB, Habo (SE)

(*) Notice: Under 35 U.S.C. 154(b), the term of this patent shall be extended for 0 days.

(21) Appl. No.: 09/284,183

(22) PCT Filed: Oct. 15, 1997

(86) PCT No.: PCT/SE97/01724

§ 371 Date: Apr. 27, 1999

§ 102(e) Date: Apr. 27, 1999

(87) PCT Pub. No.: WO98/18567

PCT Pub. Date: May 7, 1998

(30) Foreign Application Priority Data

Oct. 28, 1996 (SE) .................................................. 9603918

(51) Int. Cl.$^7$ .................................................. B32B 31/00
(52) U.S. Cl. ..................... 156/187; 156/195; 156/250; 156/425; 156/446; 156/499; 156/510; 492/29
(58) Field of Search .................................. 156/184, 187, 156/195, 250, 267, 425, 446, 499, 510; 492/29

(56) References Cited

U.S. PATENT DOCUMENTS 4,692,975 * 9/1987 Garcia ..................................... 492/29
5,137,595 * 8/1992 Garcia .................................... 156/425
5,294,276 * 3/1994 Linn et al. ............................ 156/154
5,614,047 * 3/1997 Garcia .................................... 156/187

FOREIGN PATENT DOCUMENTS 3544640  7/1986 (DE).
0589305  3/1994 (EP).

* cited by examiner

Primary Examiner—James Sells
(74) Attorney, Agent, or Firm—Ladas & Parry

(57) ABSTRACT

The invention relates to a method and a device for the manufacture of paint rollers by winding a textile fabric (3) onto a plastic tube (2) along a spiral-shaped line. According to the invention, a number of tube elements (6), having a length suitable for a paint roller, are slipped onto a revolving mandrel (1). The tube elements are clamped together so as to engage one another and so as to allow them to be rotated together with the mandrel (1). The mandrel is rotated at the same time as the fabric is would on and attached to the tube elements, after which the fabric is cut at the joints (8) between the elements. Due to the invention, the cutting can be performed in the same machine without the risk of damaging the mandrel. As the cutting is made through the fabric only, this entails much less knife wear and is less energy-consuming. Preferably, the tube elements have a toothing at their axial ends for mechanical interconnection at the joints between the tube elements and with the mandrel (1).

13 Claims, 2 Drawing Sheets

METHOD AND APPARATUS FOR THE MANUFACTURING OF PAINT ROLLERS

FIELD OF INVENTION

The present invention relates to a method and a device for the manufacture of paint rollers by winding a textile fabric onto a plastic tube along a spiral-shaped line.

In particular, the invention relates to an improved method by which a long tube with a wound-on band of textile fabric may be cut into paint rollers.

STATE OF THE ART

From DE-A1-35 44 640, a method for the manufacture of paint rollers is known, by which a textile fabric band is wound onto a plastic tube. The device for this purpose exhibits a winding mandrel, onto which the plastic tube is slipped. For winding on the textile band, an oblique guide is used, mounted on a slide, which can be displaceably controlled by means of drive chains. The device is equipped with an arrangement for heating the plastic tube so as to soften its surface in order to allow the textile band to be adhered directly to the material of the plastic tube by melting together with it.

In order for the method to be efficient, the winding of the textile band is performed over a long tube, which is subsequently cut into suitable lengths for use as paint rollers. The cutting is made in a separate machine, by a knife cutting through the fabric and the plastic tube. Cutting through the plastic tube is however energy-consuming and entails substantial wear of the knife and frequent exchanges thereof The present invention solves the above-mentioned problem through the plastic tube being separated beforehand into a number of tube elements. The tube elements are mechanically held together on the mandrel during the winding operation. After the winding, the wound tube may be cut into lengths by cutting through the textile fabric only. One advantage is that the cutting may then be performed in the same machine without any risk of damaging the mandrel. As the knife cuts through the fabric only, this causes much less knife wear and is less energy-consuming.

SUMMARY OF THE INVENTION

The present invention thus provides a method for the manufacture of paint rollers by winding a textile fabric onto a plastic tube along a spiral-shaped line.

According to the invention, a number of tube elements, each having a length suitable for a paint roller, are slipped onto a revolving mandrel. The tube elements are clamped together so as to grip each other and be able to rotate with the mandrel. The mandrel is rotated at the same time as the fabric is wound on and attached to the tube elements, after which the fabric is cut at the joints between the tube elements.

Preferably, the tube elements have a toothing at their axial ends for mechanical connection between the tube elements, and with the mandrel.

The invention also relates to a device for performing the method, as well as to a tube element for the purpose.

The invention is described in detail in the appended claims.

BRIEF DESCRIPTION OF THE DRAWINGS

An embodiment example of the invention will be described below, with the aid of the accompanying drawings, wherein.

DETAILED DESCRIPTION OF PREFERRED EMBODIMENTS

Figure 1:
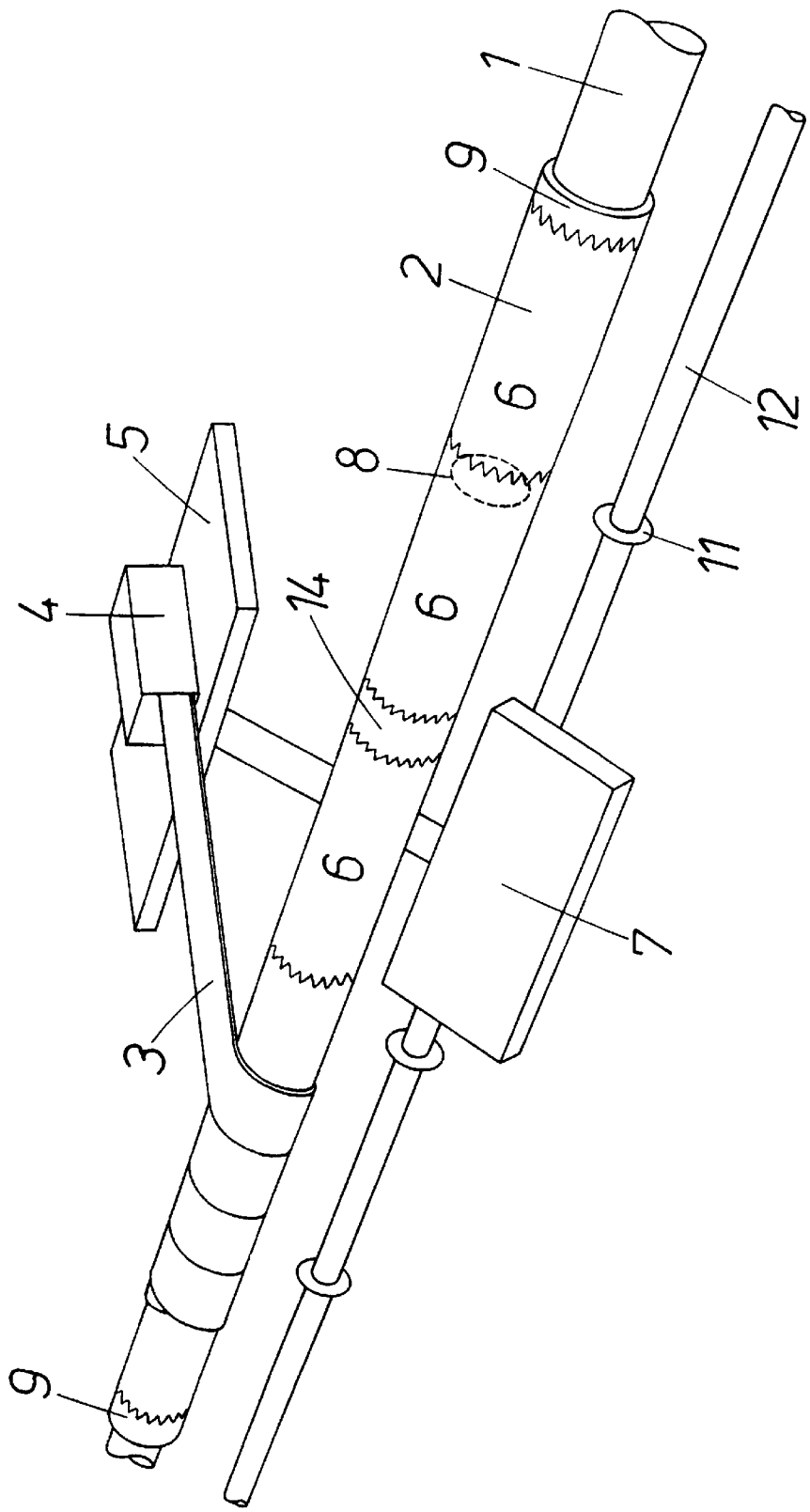
FIG. 1 shows a schematic perspective view of a device for the manufacture of paint rollers by winding a textile fabric band onto a plastic tube, according to one embodiment of the invention.

A device, as shown in FIG. 1, has a revolving mandrel 1 with a plastic tube 2 slipped onto it, on which a textile fabric band 3 is to be wound along a spiral line. The fabric band or web 3 has, on the side turned away from the plastic tube 2, a surface suitable for the application of paint. The fabric band 3 is supplied via a guide 4, obliquely arranged in relation to the mandrel 2. The guide 4 is located on a slide 5, which may be displaced in a direction parallel to the mandrel 1, by means of drive chains, a ball journal screw or the like (not shown).

The guide 4 arranged on the slide 5 is adjustable with regard to the width and thickness of the fabric band 3 and to the pulling tension thereof. The guide 4 is turnably and lockably journalled on the slide 5, so as to allow adjustment, as needed, of its angular position relative to the mandrel 1.

To the known device belongs a heating arrangement 7, which is mounted on the slide 5 by means of an intermediate bracket. A narrow outlet slot on the heating arrangement 7 runs parallel to the mandrel 1 and the plastic tube arranged thereon. In a preferred embodiment, the heating arrangement is designed as an LPG-heated soldering lamp, but other suitable heating arrangements for heating the surface of the plastic tube may of course also be used. Heating may also be performed by application of a heated plastic paste, as known from DE-A1-40 07 240. The invention does not exclude the use of conventional glue, but it is preferred to eliminate the complicated devices for application, in a suitable dosage, of the glue for fastening the fabric band onto the tube.

When using the device, the heat created by the heating arrangement 7 acts on the plastic tube 2 in that area which is immediately thereupon to be wound with the fabric band 3, so as to melt the surface of the plastic tube 2 in this area for the material of the plastic tube to melt together with the material of the wound-on fabric band 3.

The device thus allows a complete melting together of the material of the fabric band 3 and the material of the plastic tube 2. This is achieved through the supply of heat to that area of the plastic tube which is immediately thereupon to be wound, which leads to one material melting together with the other. Through this melting together of the material of the fabric band 3 and the material of the plastic tube 2, a long roll in one piece is obtained, in the shape of a body held together by the fabric band.

To the extent so far described, the device is conventional. As opposed to the previously known technique, the plastic tube 2 is however separated into tube elements 6. The tube elements are held on the mandrel 1 between two end pieces 9 which clamp the tube elements against each other.

Figure 2:
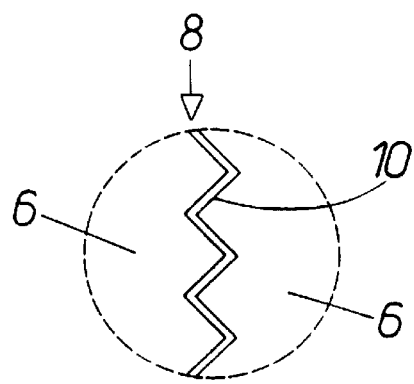
FIG. 2 shows a detail of a joint between two tube elements.

Furthermore it is preferred that the tube elements have a toothing at their axial ends. The toothing 10 is best seen from the partial view in FIG. 2. As pressure is applied between the end pieces 9, the toothings of the tube elements are pressed into each other to form a non-rotating joint 8, preventing the tube elements 6 from rotating relative to each other. The end pieces 9 have a corresponding toothing, and as the mandrel is turned, all tube elements will rotate as one unit between said end pieces. Other shapes than zig-zag toothing are also conceivable, e.g. square teeth and similar, or even a shape without teeth if a sufficiently high pressure is applied between the end pieces 9.

The clamping together of the tube elements 6 between the end pieces 9, prevents or reduces the longitudinal expansion of the plastic tube during heating. As the fabric is wound on when the tube is hot, tensions may otherwise be built into the paint roller if the tube element contracts in relation to the fabric when the wound roller cools off. The secure clamping of the plastic tube also allows the use of a thinner plastic tube than would be the case if the plastic tube was only fixed at one end.

In order to separate the tube elements from each other, a cutting device is utilised, mainly comprising cutting pulleys 11 which, by means of distance elements, are arranged with suitable spacing along a revolving shaft 12. The shaft 12 is parallel to the mandrel 1 and can be advanced towards the mandrel to cut the fabric at each joint 8 when the fabric has been wound onto the entire plastic tube 2.

When the fabric has been cut between the tube elements 6, these are pushed off the mandrel by a conventional, not shown ejector assembly. During the heating of the plastic tube 2, also the toothing 10 on the tube elements is partially melted, thereby causing them to adhere lightly to each other. This adhesion is however so weak that it is broken up when the tube elements 6 are ejected from the machine.

It is sometimes desirable that the fabric is wider than the roll, i.e. protrudes somewhat past the axial ends of the roller, in order to allow folding of the fabric over the ends of the tube element and fixing it by means of the end plugs in a known fashion. In order to achieve this, distance pieces 14 are provided between the tube elements 6. The distance pieces 14 may for example be made from PTFE-treated metal, preventing the fabric 3 from adhering to them. The cutting of the fabric 3 is performed at the distance pieces 14 in order for the fabric to have the desired width. The distance pieces are ejected together with the tube elements, but are collected for renewed use in the process.

One advantage of the present invention is that the device may be designed in a revolving embodiment (not shown). The revolving mechanism comprises a num30 ber of mandrels which are each utilised simultaneously for one stage of the manufacturing process. These stages comprise, where appropriate, slipping on the tube elements, winding on the fabric, piling, cutting the fabric to achieve an even pile, cutting off the fabric, and ejection. By clamping the tube elements together, rotation of the mandrel can be used during stages requiring such action.

In order to complete a ready-to-use paint roller, a tube element 6 with its attached fabric will further need only the two end plugs 13, for the journalling of a rotational shaft and the mounting of a handle.

Figure 3:
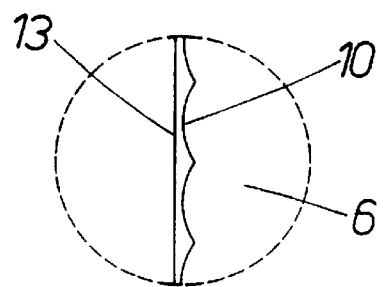
FIG. 3 shows a detail of a melted tube element with a plugged-in end plug unit.

In order to avoid any remaining sharp edges at the toothing 10, the latter is melted somewhat, about 50%, by further heating, before the end plugs 13 are fitted into the tube elements 6. FIG. 3 shows a partial view of a tube element 6 with an end plug 13 fitted. One can see that what is left of the toothing 10 does not protrude past the end plug, but lies approximately flush with it. It is also possible to cut away the toothing completely to obtain an entirely smooth edge.

Figure 4:
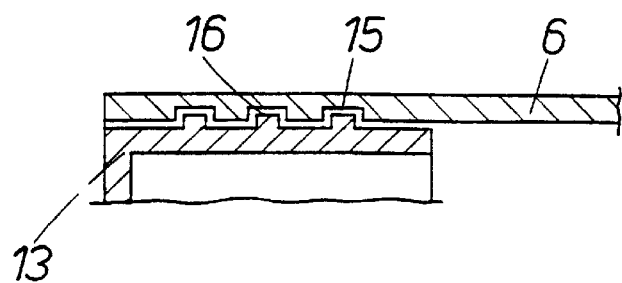
FIG. 4 shows a cross section of a tube element and an end plug unit.

The tube elements are preferably manufactured by injection moulding, in order to provide the toothing in a simple manner. During the injection moulding, internal grooves 15, as shown in FIG. 4, may also be shaped. The grooves 15 are intended for enhancing the attachement of the end plugs 13, which are provided with flanges 16 to interact with the grooves 15. A depth of about 0,1 mm of the grooves 15 is sufficient for achieving the desired effect.

What is claimed is:

1. A method for the manufacture of paint rollers by winding a textile fabric onto a plastic tube along a spiral-shaped line, wherein a number of tube elements, having a length adapted to that of a paint roller, are slipped onto a revolving mandrels, the tube elements are clamped together so as to engage each other and to allow them to be rotated together with the mandrel, the mandrel is rotated at the same time as the fabric is wound and fastened onto the tube elements, and in that the fabric is cut off at the joint between the tube elements.

2. The method according to claim 1, wherein the tube elements are shaped with a toothing at their ends, for mechanical interconnection between the tube elements.

3. The method according to claim 2, wherein the toothing is at least partially melted down or cut away after ejection of the tube elements.

4. A method according to claim 3, wherein the fabric is fastened to the tube elements by heating said tube elements and melting the fabric and the tube elements together.

5. A method according to claim 4, wherein distance pieces, which do not adhere to the fabric, are interconnected between the tube elements.

6. A device for the manufacture of paint rollers by winding a textile fabric onto a plastic tube along a spiral-shaped line, comprising a revolving mandrel onto which a number of tube elements, having a length adapted to that of a paint roller, may be slipped, means for clamping the tube elements together so as to engage them with each other, and to allow them to be rotated together with the mandrel, means for guiding the fabric band towards the mandrel so that the fabric is wound and fastened onto the tube elements, and means for cutting off the fabric at the joints between the tube elements.

7. The device according to claim 6, wherein the tube elements are shaped with a toothing at their ends, for mechanical interconnection between the tube elements.

8. The device according to claim 7, wherein the clamping means has a toothing for mechanical connection to the tube elements.

9. A device according to claim 8, wherein the cutting means comprises cutting pulleys arranged on a displaceable shaft, parallel to the mandrel.

10. A device according to claim 9, wherein a heating arrangement is provided for heating the tube elements so as to melt said tube elements together with the fabric.

11. A device according to claim 10, wherein distance pieces which do not adhere to the fabric are interconnected between the tube elements.

12. A tube element to be used when executing the method of claim 1, wherein having a toothing at its axial edges.

13. The tube element according to claim 12, wherein having internal grooves to aid the attachment of end plugs.

* * * * *